(12) United States Patent
Dykstra et al.

(10) Patent No.: US 10,981,209 B2
(45) Date of Patent: Apr. 20, 2021

(54) FORMING PROCESS USING MAGNETIC FIELDS

(71) Applicant: Temper IP, LLC, Rockford, MI (US)

(72) Inventors: William C. Dykstra, Rockford, MI (US); Luke A. Martin, Wyoming, MI (US)

(73) Assignee: TEMPER IP, LLC, Rockford, MI (US)

( * ) Notice: Subject to any disclaimer, the term of this patent is extended or adjusted under 35 U.S.C. 154(b) by 625 days.

(21) Appl. No.: 15/507,473

(22) PCT Filed: Sep. 4, 2015

(86) PCT No.: PCT/US2015/048453
§ 371 (c)(1),
(2) Date: Feb. 28, 2017

(87) PCT Pub. No.: WO2016/037021
PCT Pub. Date: Mar. 10, 2016

(65) Prior Publication Data
US 2017/0297077 A1    Oct. 19, 2017

Related U.S. Application Data

(60) Provisional application No. 62/045,877, filed on Sep. 4, 2014.

(51) Int. Cl.
*B21D 26/14*     (2006.01)
*B29C 51/42*     (2006.01)
(Continued)

(52) U.S. Cl.
CPC ............... *B21D 26/14* (2013.01); *B21D 5/00* (2013.01); *B29B 13/023* (2013.01); *B29C 51/42* (2013.01);
(Continued)

(58) Field of Classification Search
CPC ...... B29C 2035/0816; B29C 2043/568; B21D 5/008; B21D 22/10; B30B 11/008
See application file for complete search history.

(56) References Cited

U.S. PATENT DOCUMENTS 3,193,734 A * 7/1965 Hempstead ............... H01F 6/00
                                                   335/216
5,410,132 A * 4/1995 Gregg .................. B21D 26/055
                                                   219/604
(Continued)

OTHER PUBLICATIONS

International Search Report and Written Opinion dated Oct. 21, 2015 from corresponding PCT Application No. 048453 filed Dec. 4, 2015.

*Primary Examiner* — Sheng H Davis
*Assistant Examiner* — Christopher D. Moody
(74) *Attorney, Agent, or Firm* — Honigman LLP

(57) ABSTRACT

Assisted magnetic forming uses a magnetic field to assist in the forming or molding of metallic and non-metallic materials. For example, such a forming process may form a blank of ferromagnetic metals like high-strength steel and high-hard armor, non-ferromagnetic metals like aluminum and magnesium, as well as non-metals like ceramics, plastics, and fiber-reinforced composites into formed or molded parts. The magnetic field is generated to partially or completely saturate the blank during the forming process, which increases the blank's formability and/or moldability while in the presence of the magnetic field.

20 Claims, 18 Drawing Sheets

(51) Int. Cl.
    *B21D 5/00*          (2006.01)
    *B29C 35/04*       (2006.01)
    *B29C 35/08*       (2006.01)
    *B29B 13/02*       (2006.01)

(52) U.S. Cl.
    CPC .......... *B29C 35/041* (2013.01); *B29C 35/045* (2013.01); *B29C 2035/0811* (2013.01); *B29C 2035/0822* (2013.01); *B29C 2035/0838* (2013.01)

(56) References Cited

U.S. PATENT DOCUMENTS

| | | | | |
|---|---|---|---|---|
| 6,091,063 | A | * | 7/2000 | Woods ................. B23K 20/023 |
| | | | | 219/633 |
| 6,151,938 | A | * | 11/2000 | Park ....................... B21D 22/10 |
| | | | | 72/413 |
| 6,773,513 | B2 | * | 8/2004 | Ludtka ..................... C21D 1/04 |
| | | | | 148/108 |
| 8,410,409 | B1 | * | 4/2013 | Matsen ............... B29C 35/0805 |
| | | | | 219/600 |
| 8,556,619 | B2 | | 10/2013 | Matsen et al. |
| 9,656,317 | B1 | * | 5/2017 | Dykstra .................... B21K 7/12 |
| 2012/0067100 | A1 | | 3/2012 | Stefansson et al. |
| 2013/0000375 | A1 | | 1/2013 | Okada et al. |

\* cited by examiner

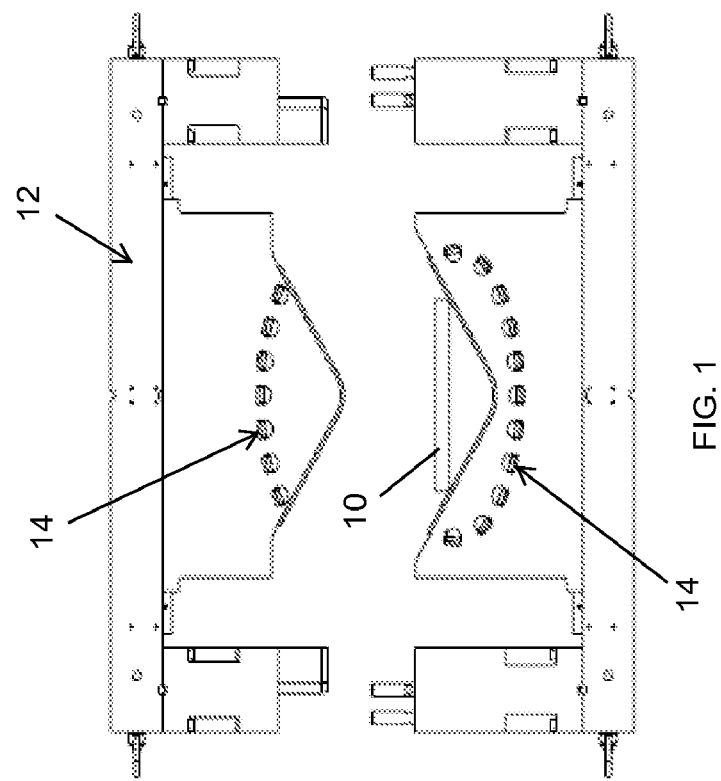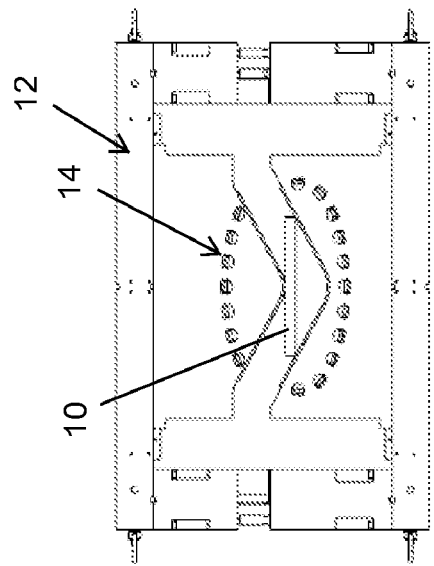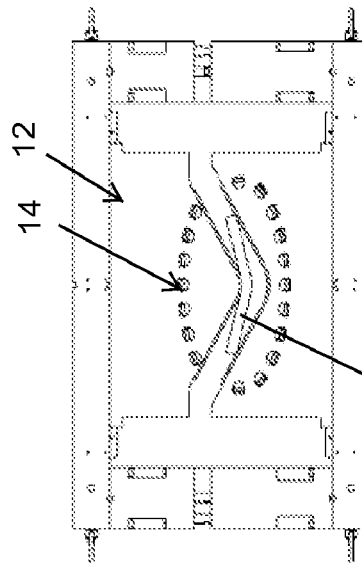

Simplified decision tree used to develop the test plan on the results of a previous experiment

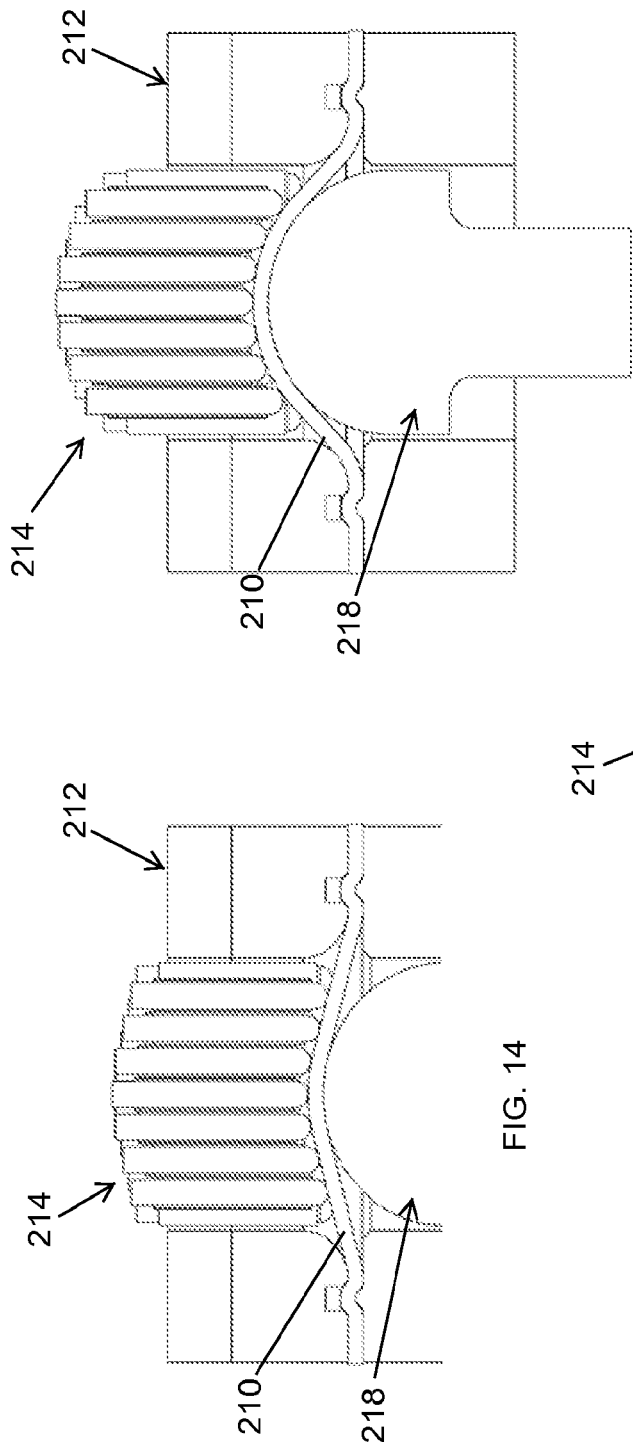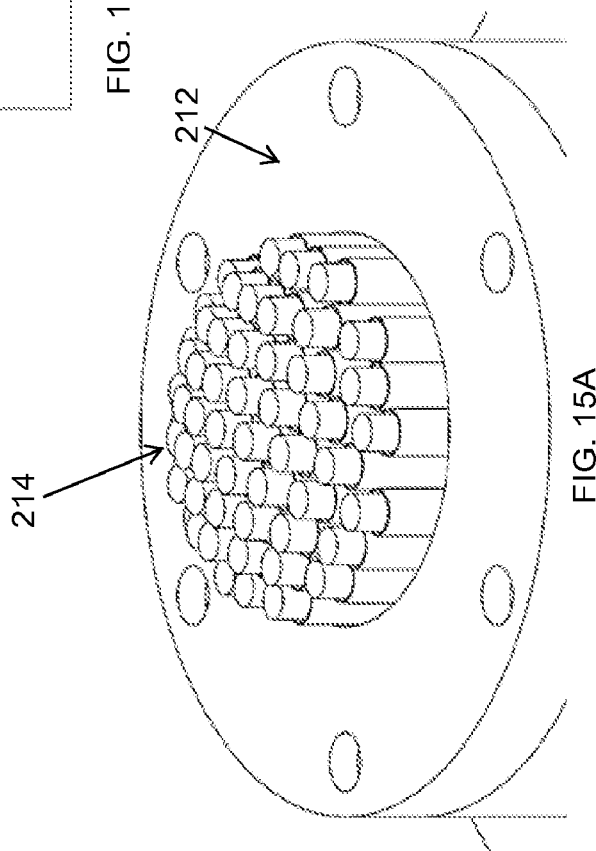

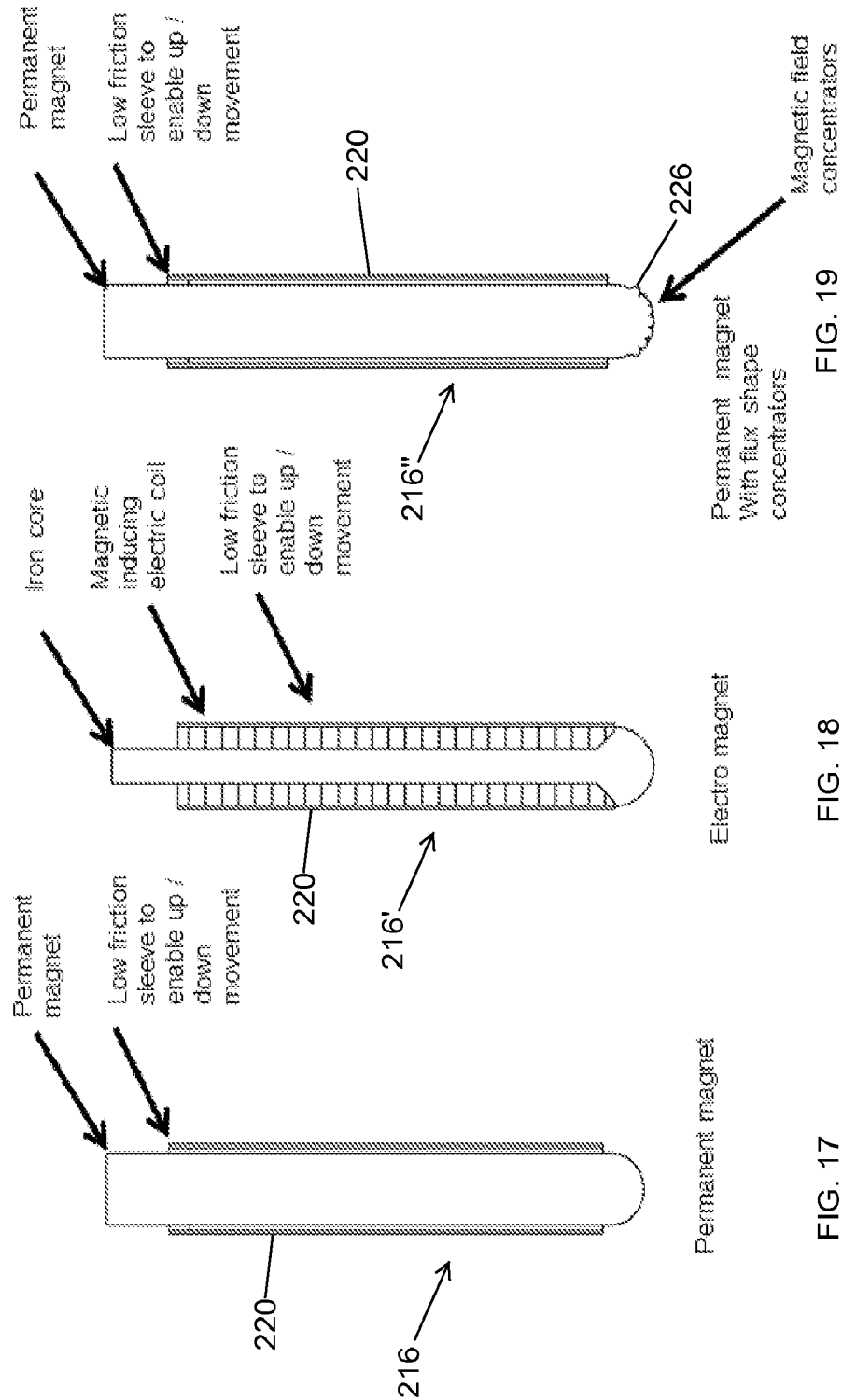

FORMING PROCESS USING MAGNETIC FIELDS

CROSS REFERENCE TO RELATED APPLICATIONS

The present application is a 371 national phase filing of PCT Application No. PCT/US2015/048453, filed Sep. 4, 2015, which claims the filing benefit of U.S. provisional application Ser. No. 62/045,877, filed Sep. 4, 2014, which is hereby incorporated herein by reference in its entirety.

This invention was made with government support under W56HZV-14-C-0178 awarded by U.S. Army Contracting Command. The government has certain rights in the invention.

FIELD OF THE INVENTION

The present invention is directed to a forming process for forming or molding metallic and non-metallic material, particularly forming with a tooling.

BACKGROUND OF THE INVENTION

Forming high strength material, such as rolled homogeneous armor (RHA), high hard (Hi-Hard) armor, advanced high strength steel, and other metals can be difficult due to low formability and moldability of the material, namely, such material does not bend well. Hot stamping has been developed to overcome the forming limitations of traditional metals. The process takes advantage of a metal's increased ductility at elevated temperatures. As the metal heats up, the constitutive atoms are allowed more freedom of movement, which means that the atoms can flow and rearrange themselves to achieve a lower stress state. An implication is also decreased forming pressure. More simply, the heat allows the metal to stretch without breaking while using lower press tonnage. Over time, this concept has evolved into technologies like hot stamping, hot metal gas forming (HMGF), and superplastic forming (SPF). Unfortunately, hot stamping, HMGF, and SPF all have a similar flaw in regards to RHA and Hi-Hard: heat. When material heats and the atoms move around, the effects from cold working, thermal processing, and hardening are removed. These effects are important in developing or maintaining the mechanical properties of materials being formed; therefore, a material cannot be heated to a point that removes these effects, which renders hot stamping, HMGF, and SPF processes unusable. Another option is to use a hot stamping process on a part and then apply the mechanical or thermal processing after forming. Applying any mechanical processing after forming would severely alter the shape of a part, and quenching or other thermal treatment would cause warping.

SUMMARY OF THE INVENTION

Assisted magnetic forming or "Mag Forming" is a technology that uses a magnetic field to assist in the forming or molding of metallic and non-metallic materials. Examples of materials for which Mag Forming is applicable includes ferromagnetic metals like high-strength steel and high-hard armor, non-ferromagnetic metals like aluminum and magnesium as well as non-metals like ceramics, plastics, and fiber-reinforced composites.

The Mag Forming process of the present invention uses a magnetic field to fully or partially saturate the material being formed. The effect of the magnetic field results in enhanced ductility from the macro and/or micro interactions of the bulk material or individual atoms. The enhanced ductility due to a magnetic field could result in as little as about ½ percent increase in total elongation or as much as 1000 percent increase in elongation depending on the material, the temperature, the magnetic field and the strain rate being applied.

The present invention uses specialized Mag Forming tooling that has one or more magnetic sources, such as integrated electromagnetic coils, an external electromagnetic coil, or other integrated, internal, or external magnetic sources. Examples of other magnetic sources include, but are not limited to, superconducting magnets, permanent magnets, super-magnets, temporary magnets, electromagnets, and any other magnetic source in any sort of array, such as a Halbach array. In addition, the invention may also include magnetic fields that could be generated from multiple different types of magnetic sources either in sequence, in phased sequences, in phased sequences such as using switching to turn the magnetic fields on and off, either together or separately, sequentially or simultaneously. In addition, the polarity of the magnetic fields can also be alternated, in a positive to negative and back to positive pattern. The invention may also include all of the aforementioned different methods of applying single or multiple fields, but in addition applying pressure to the workpiece from one or more sources, such as from solid punch, a fluid (gas or liquid), or both at the same time. Temporary magnets behave like permanent magnets while under the influence of a magnetic field. With regards to Mag Forming, a temporary magnet could be a piece of iron influenced by a superconducting magnet or other magnetic source, which would then cause the piece of iron to create a magnetic field for the Mag Forming purposes.

The Mag Forming technology uses a magnetic field to increase formability and moldability of materials. The tooling of the present invention may have electromagnetic coils integrated into the forming or molding die. The magnetic field can be a steady state, direct current, type of field or a non-steady state field. The non-steady state field can be generated by running an alternating current through the electromagnetic coils or have varying ramp-ups and downs that create non-periodic fluctuations in the magnetic field. Furthermore, the magnetic field can vary in intensity resulting in a gradient field. For example, magnetic fields from a few milligauss to over 10 Tesla in strength can be used in Mag Forming. It is also possible that the changing magnetic field can be produced by physically moving the part relative to the magnetic field, or vice versa. An example of this situation is when the tooling or part has an oscillation into and out of the magnetic field or from one polarity to the other. This can be achieved by moving the magnetic source while holding the tooling stationary, moving the tooling while holding the magnetic field stationary, or moving both the magnetic field and tooling relative to one another.

Alternatively, the magnetic field may be turned on and off at a given frequency. This method could be used at any forming speed, but may be practically important at slow forming speeds such as a strain rate of $10^{-4}$ in/in/sec. If the particular material exhibits slightly enhanced elongation during the ramp up of the magnetic field, then the strain rate is defined by the ramp up cycle. With this scenario, the magnetic field can be easily cycled on and off thereby allowing more periods of enhanced elongation. The frequency of the magnetic field cycling could be as little as about 1 Hz or as high as about 500,000 kHz. The selected frequency depends on the material, geometry, and required formability.

Additionally, the material being formed or molded may undergo heating. The blank being used in the Mag Forming process can be preheated outside of the Mag Forming tooling and transferred in or the blank can be heated from inside the tooling. The source of the heat can be from induction, conduction, convection, radiation, or phase change. Induction heating can come from the same coils used to generate the magnetic field or a separate set of coils. Heat can be conducted to the blank by heating the Mag Forming tooling which then transfers heat to the blank or the blank and/or tooling are heated by convection with hot or superheated gases or liquids. Similarly, superheated gases condense on the tooling or blank which transfers energy from to the components through a combination of convection, conduction, and phase change. Additionally, lasers or inferred light can radiate energy onto the tooling or blank. Or, the tooling and/or blank can be heated in an oven. The blank can be preheated by any number of heating methods and placed into the die for processing.

The Mag Forming process may also use one or more tools or interchangeable tools with a single magnetic source. For example, an electromagnet can be large enough to generate a magnetic field that is capable of supporting multiple Mag Forming tools. Furthermore, these tools can be swapped out as needed without having to change the magnetic source.

The Mag Forming process could also be integrated with internal quenching, to assist increasing production, or enhancing material characteristics by controlling the quenching rate of the material. Quenching could be induced through air, air and water or water or other liquids or the like. In addition, quenching could be induced by rapidly chilling one or both of the shape inducing tooling components.

These and other objects, advantages, purposes and features of the present invention will become more apparent upon review of the following specification in conjunction with the drawings.

BRIEF DESCRIPTION OF THE DRAWINGS

FIG. 1 is an end elevation of a tool of the present invention, with a blank inserted therein and with an integrated magnetic source;

FIGS. 2 and 3 are end elevations of the tool of FIG. 1, showing the closing of the die while generating the magnetic field;

FIG. 14 is a cross-sectional elevation of the tool of FIG. 13, showing a stage of a corresponding forming process with the punch moving to deform the blank and cause the array of movable magnets to move and conform to the deformed shape of the blank;

FIG. 15 is a cross-sectional elevation of the tool of FIG. 13, showing another stage of the corresponding forming process with the punch moving further to deform the blank and cause the array of movable magnets to move and conform to the deformed shape of the blank;

FIG. 15A is a perspective view of the tool of FIG. 15, showing various heights of the separate magnets in the array of movable magnets after the blank has been deformed from pressure applied by the punch;

FIG. 17 is a cross-sectional view along an axis of a permanent magnet that may be used in the array of movable magnets, showing a low friction sleeve to enable movement of the magnet relative to the surrounding magnets or other surfaces;

FIG. 18 is a cross-sectional view along an axis of an electro magnet that may be used in the array of movable magnets, showing a low friction sleeve and a magnetic inducing electric coil around an iron core;

FIG. 19 is a cross-sectional view along an axis of a permanent magnet that may be used in the array of movable magnets, showing a low friction sleeve and flux shape concentrators at a blank engaging end of the magnet to concentrate the magnetic field at the point of contact with the blank;

DESCRIPTION OF THE PREFERRED EMBODIMENTS

Figure 5:
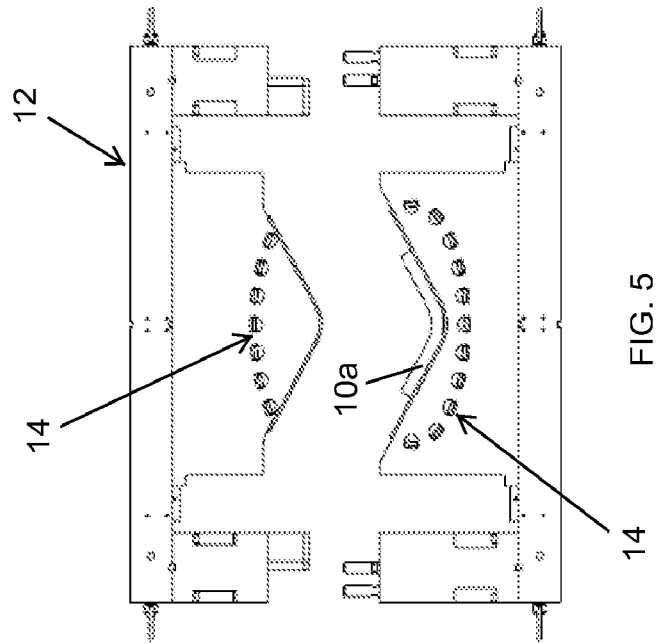
FIG. 5 is another end elevation of the tool, with the die opened for removal of the formed part.

The present invention provides a process that enhances forming properties of metals, such as steel, aluminum, magnesium or titanium. More specifically the process can be also used to enhance the forming of steels such as stainless steels, armor materials, such as rolled homogeneous armor (RHA), and high hard (Hi-Hard) armor (HHA) and advanced high strength steel, such as High strength steel, Ultra High Strength steels, and steels of strengths over 200 megapascal, and at low temperatures, steels with strengths generally over 700 megapascal. More specifically, the new forming technology has the capabilities to allow complex die forming of armored steel components for applications ranging from underbelly protection to light truck door skins or the like. The tool and process of the present invention, multiple embodiments of which are shown in FIGS. 1-28, may be operable to form RHA and Hi-Hard armor to a bend radius of less than three times the material thickness while maintaining about 95 percent of the pre-formed material properties.

The problem with forming these high strength metals, such as RHA or Hi-Hard steels, is that they do not bend well. RHA gets its strength from thermomechanical processing, meaning it undergoes a series of work hardening and heat treatment processes to achieve its material properties. The forming difficulties associated with Hi-Hard are more challenging than for RHA. Hi-Hard armor obtains its properties from a thermal treatment, such as a heat and quench process. This produces a very strong and hard metal, but again, under normal conditions, it does not bend.

The Mag Forming process of the present invention is a groundbreaking process that harnesses magnetic plasticity to repair microscopic fissures and stress fractures before they develop into cracks and stress risers. This generates enhanced forming possibilities for otherwise unworkable metals at low temperatures. The evolution of this process is drawn from the failure mode of a hard metal in a typical stamping operation, along with the atom movement seen in hot stamping. During the Mag Forming process, the magnetic field interacts with the electrons on an atomic level, which causes them to shift. This shifting of atoms allows for enhanced forming properties in otherwise unbendable metals. Additionally, it is envisioned that the Mag Form processing speeds may approach those of hot stamping processes. The result is a highly competitive technology that can form metals such as RHA, Hi-Hard armor, and other unworkable metals and materials, at low temperatures, without losing the thermomechanical or heat-treatment properties.

Important parameters of the process of the present invention include magnetic field strength, magnetic field cycling, strain rate, and temperature. A magnetic field strength of around 0.5 Tesla (T) may be required to saturate the ferromagnetic material. Although field strengths as low as 0.001 T to as much as 20.0 T will produce increases in ductility, the amount of ductility increase depends on the type of material to be formed, thickness and time.

Creep mechanisms are the dominant failure mode in superplastic deformation processes. Balancing the creep mechanisms with the ability of the magnetic field to mobilize the atoms for enhanced ductility and reduced forming loads is an important parameter. The primary variable controlling this parameter is the strain rate for which an optimum value can be found. Another process parameter is temperature. Increasing temperature increases strain and decreases forming pressure; however, the material properties are temperature sensitive as well. Finally, the magnetic frequency plays a role in the process. Therefore, the process of the present invention enhances the forming capabilities of a material at low temperatures so the RHA and Hi-Hard armor can be achieve a tighter bend radius without losing existing properties or requiring additional thermal processing.

The Mag Form technology is based on theoretical magnetic plasticity fundamentals that have been tested. The Mag Forming test results showed that the process is capable of achieving a significant increase in elongation for HHA and a similar increase in elongation for RHA when compared to the respective baseline elongations.

The Mag Forming process may be implemented in various embodiments of tooling, magnetic sources, and magnetic field arrangements, such as those shown in FIGS. 1-28. Referring generally to the embodiments shown in FIGS. 1-9, a process using Mag Forming technology provides a tooling 12 configured to form a blank 10 into a part 10a. In the process, a magnetic field is generated with at least one magnetic source 14 that at least partially saturates the blank 10 in the tooling 12. In the presence of the magnetic field, the blank's formability and moldability is increased, allowing the part 10a to be formed with the tooling 12 by plastically deforming the blank 10. It is understood that the part 10a may be a completed part for an intended use, such as in an assembly or apparatus or the like, or may be an intermediate shape that requires further processing to arrive at the completed part.

Figure 4:
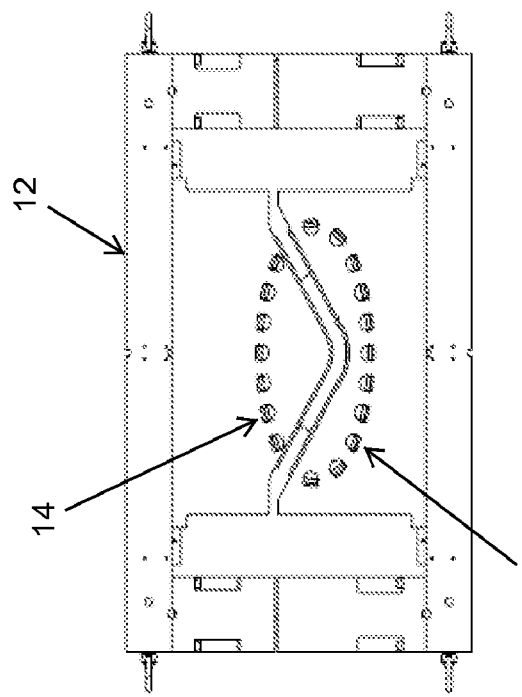
FIG. 4 is another end elevation of the tool of FIG. 1, showing the die closed to complete the forming process.
Figure 6:
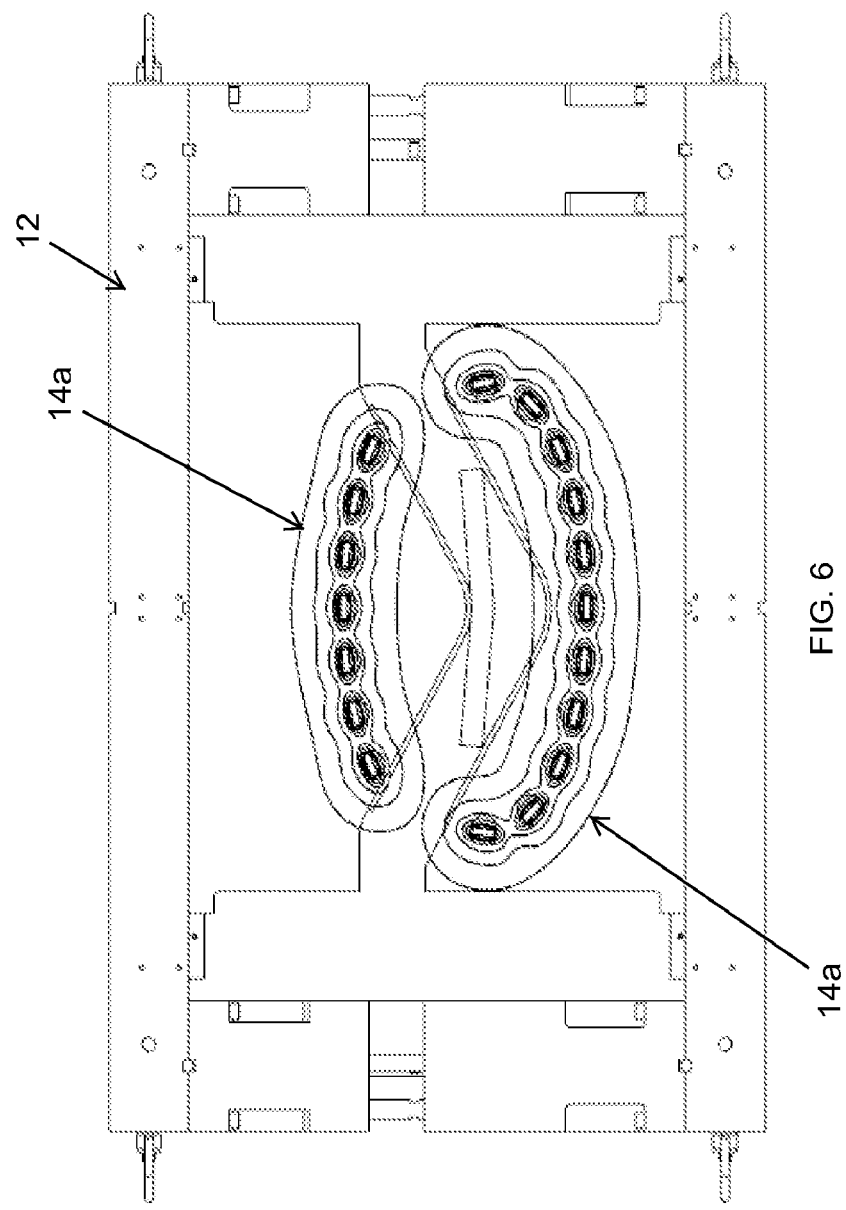
FIG. 6 is another end elevation of the tool, showing a partial view of the magnetic field generated by the integrated magnetic source.
Figure 12:
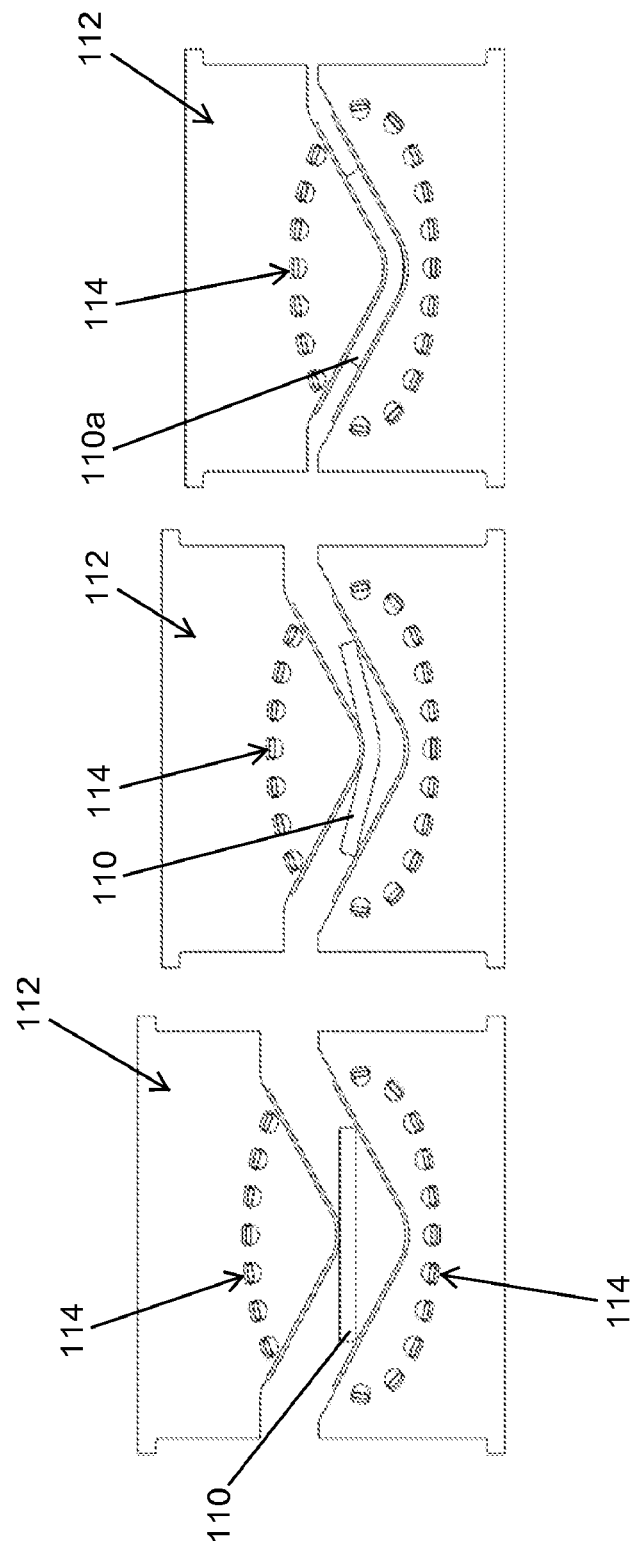
FIG. 12 shows end elevations of the tool during a forming process in accordance with the present invention.
Figure 13A:
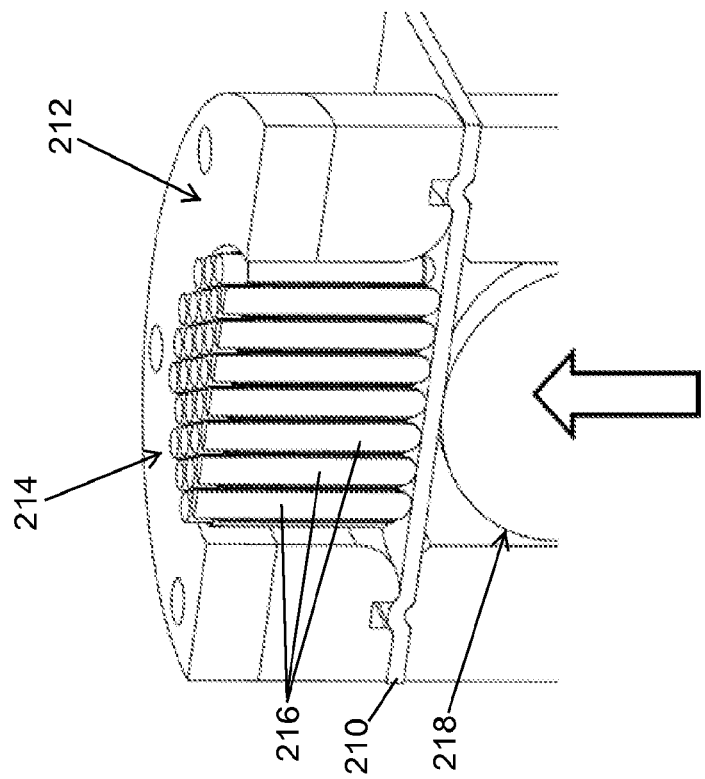
FIG. 13A is a cross-sectional perspective view of the tool of FIG. 13, showing the punch that interfaces with the blank causing the array of movable magnets to move and conform to the shape of the material being formed.
Figure 13:
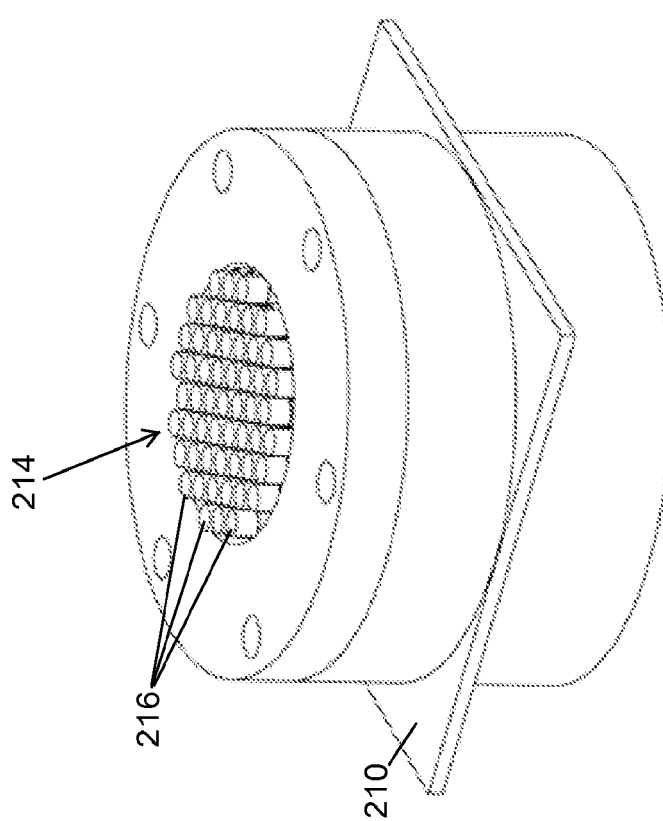
FIG. 13 is a perspective view of another tool of the present invention, with an array of movable magnets applying a magnetic field directly at the surface of one side of a blank being formed and a movable punch on the other side of the blank.

Referring to FIGS. 1-5, an exemplary Mag Forming process is illustrated where the blank 10 is inserted over the cavity of the lower die piece of the tooling 12, as shown in FIG. 1. The upper die piece is then lowered toward the lower die piece, as shown in FIGS. 1-3, and simultaneously with putting pressure on the blank 10, the magnetic source 14 is activated to begin generating the magnetic field 14a, as shown in FIG. 6. Once the forming cycle is complete, as shown in FIGS. 4 and 5, the magnetic source 14 is deactivated and the die pieces are opened to remove the formed part 10a. A similar forming process is also shown in FIG. 12 with a blank 110 having two layers of material that is formed into the part 110a and the magnetic source 114 partially exposed at edges of the upper and lower die pieces of the tooling 112.

Figure 7:
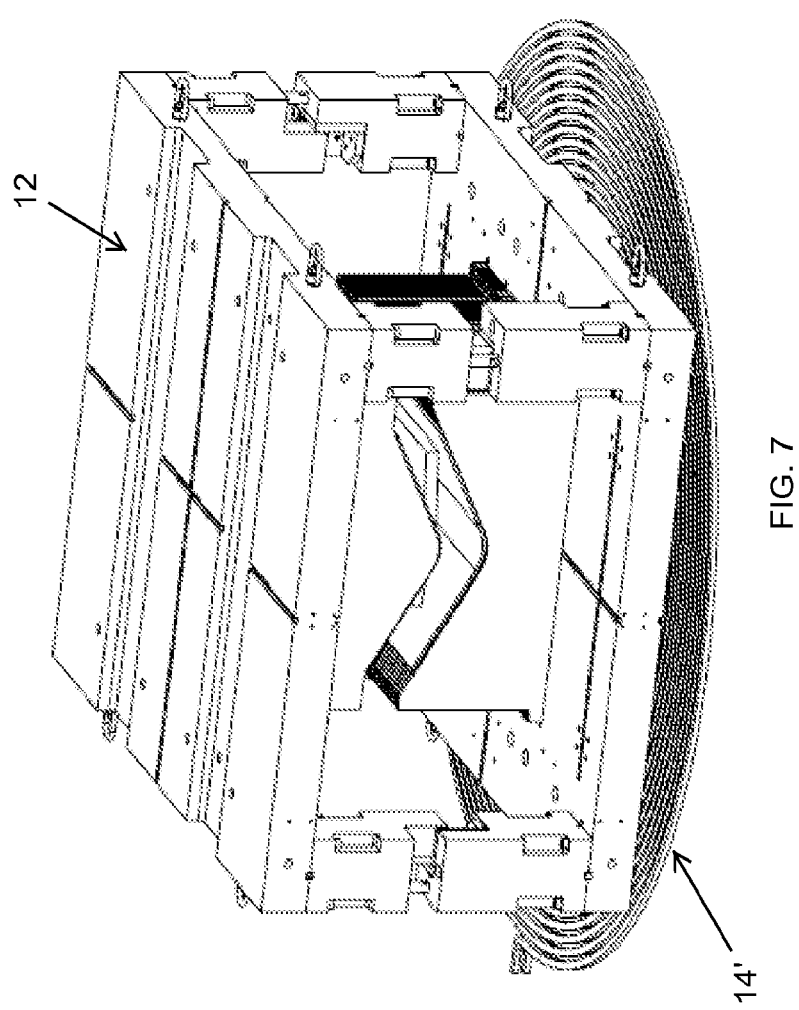
FIG. 7 is a perspective view of another tool of the present invention, with an external magnetic source.
Figure 8:
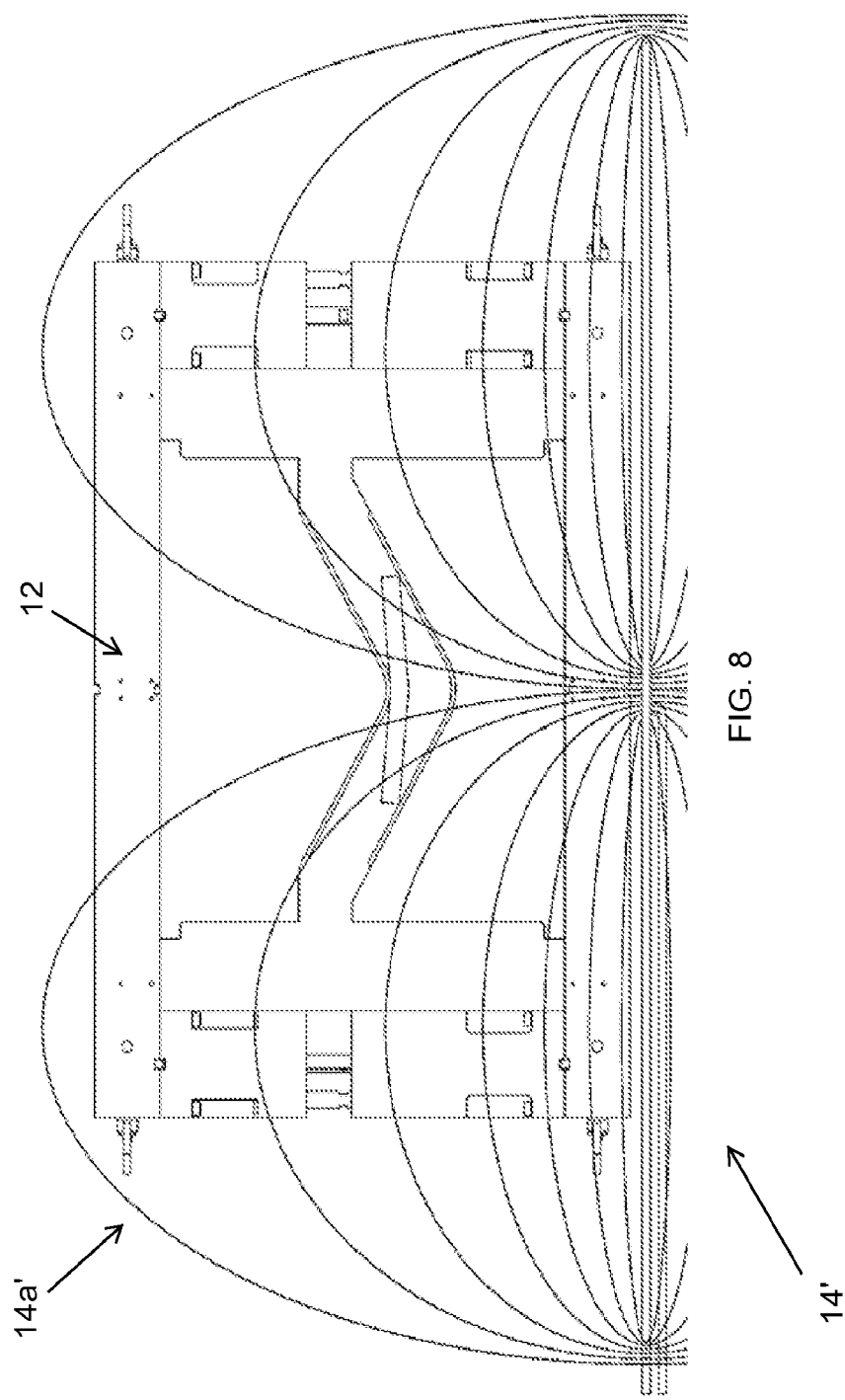
FIG. 8 is an end elevation of the tool of FIG. 7, showing the magnetic field generated by the external magnetic source.
Figure 9:
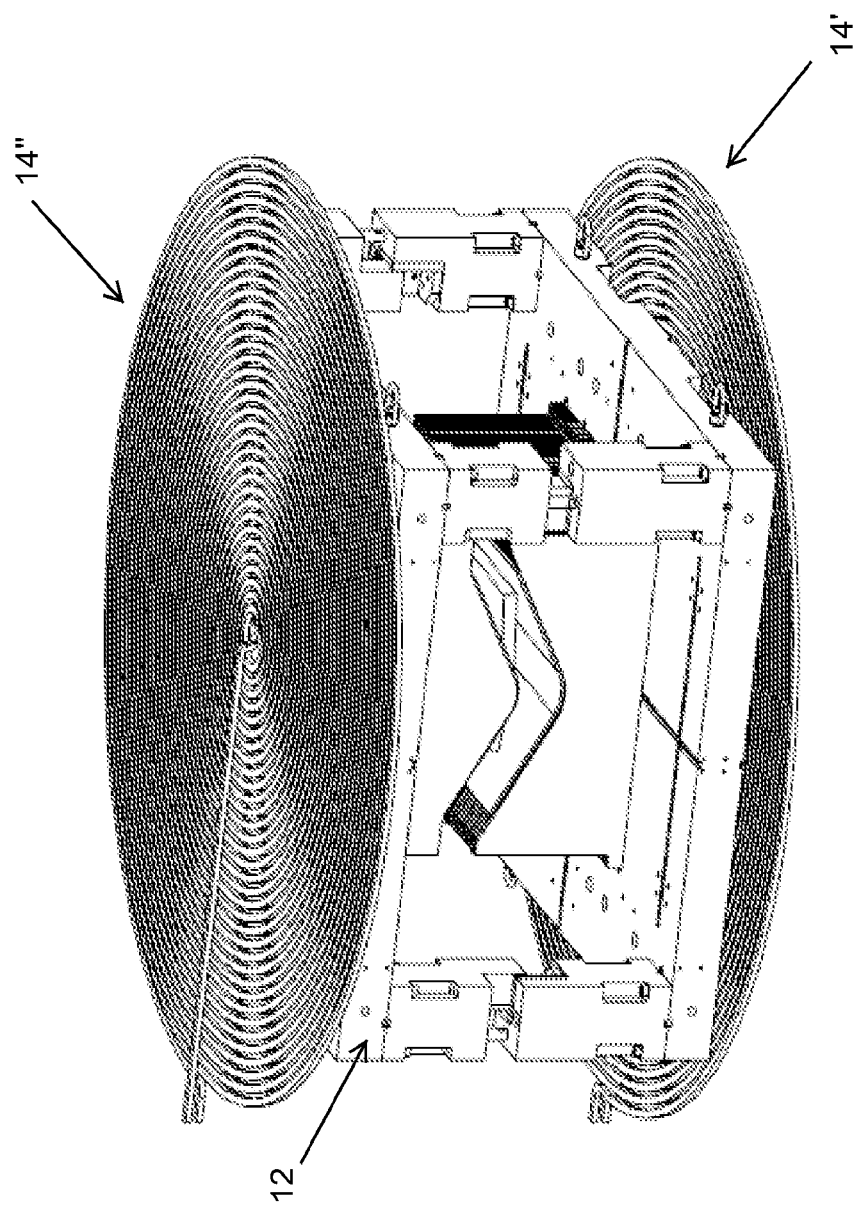
FIG. 9 is a perspective view of another tool of the present invention, with multiple external magnetic sources.
Figure 10:
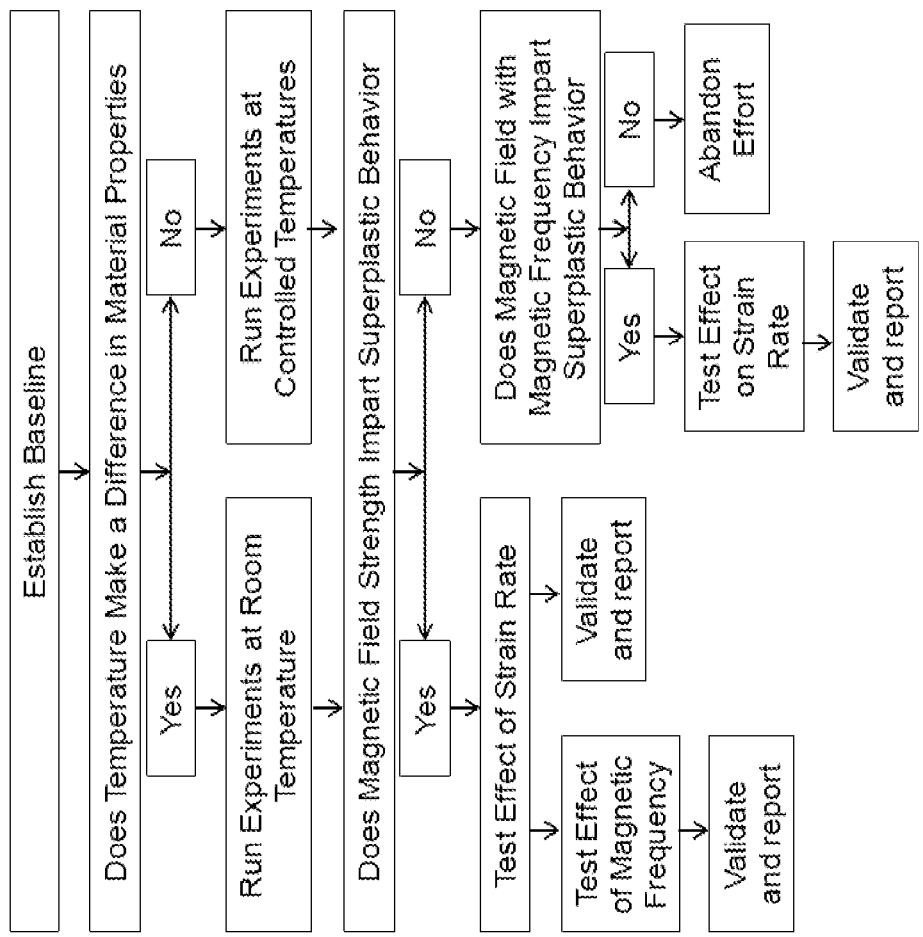
FIG. 10 is a flow chart for developing a test plan based on previous experiment results.
Figure 11:
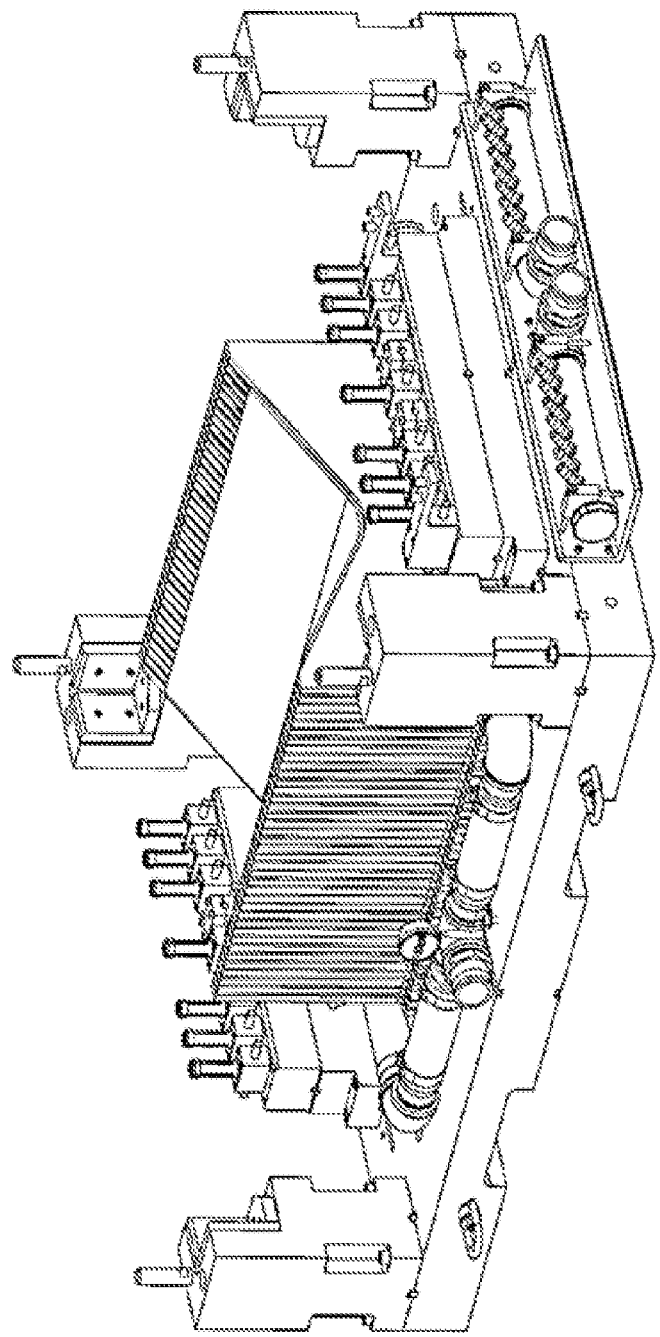
FIG. 11 is a perspective view of a lower part of a tool of the present invention.

The material of the blank 10 may include one or a combination of a high strength steel, a ballistic armor, aluminum, magnesium, stainless steel, ceramic, plastic, and fiber-reinforced composite. The magnetic source 14 may be coupled with or integrated with the tooling 12 or otherwise near the tooling to transmit a magnetic field that at least partially saturates the blank during forming. For example, as shown in FIGS. 7-9, different arrangements of external magnetic sources 14' generating magnetic fields 14a' are illustrated as pancake coils disposed below a lower die piece and in FIG. 9 magnetic sources 14" are also disposed above the upper die piece of the tooling. Also, and such as shown in FIGS. 20-28, the tooling may include different arrangements of electro magnets imbedded in the tooling. The magnetic source 14 may be one, multiple, or a combination of different types of magnetic sources, such as an electromagnet, a superconducting magnet, a permanent magnet, and a temporary magnet.

The magnetic sources 214, 314, as shown in FIGS. 13-16, may comprise a plurality of independently movable magnetic elements 216 that directly contact an upper surface of the blank 210. By contacting the blank 210, the magnetic field is applied directly to the blank 210. Various pressure mechanisms may be used to form the blank, such as a movable punch 218 that contacts a lower surface of the blank 210. The forming pressure is thereby induced from the punch under the material to be formed. The magnetic elements 216 may be arranged in an array in contact with the blank 210 in a manner that during the forming process, at least some of the magnets 216 move, conform to the shape of the deformed part, and stay in contact with the blank 210 to induce a magnetic field in the material to be formed. Therefore, the plurality of independently movable magnetic elements 216 may move relative to each other to conform to a shape of the blank as 210 it is plastically deformed by the tooling 212. To reduce friction from such movement of the array of magnets 216 relative to each other and the tooling surrounding the magnets, the magnets may be partially or completed wrapped or encased in a low friction material, such as a polymer or silicon. For example, as shown in FIGS. 17-19, different types and shapes of magnets 216, 216', 216" may include a low friction sleeve 220 to enable up and down movement of the magnets, such as for use in the arrangements shown in FIGS. 13-16.

Figure 16:
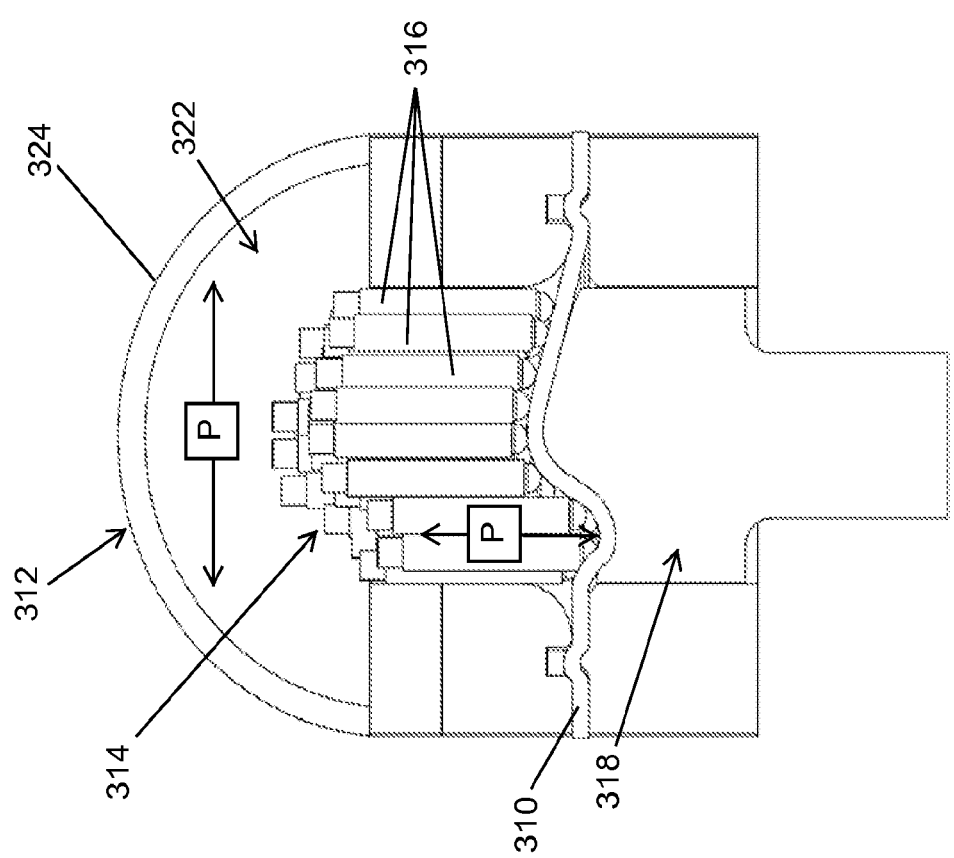
FIG. 16 is a cross-sectional view of another tool of the present invention, with forming pressure simultaneously applied to both sides of the blank, showing a movable punch interfacing with one side of the blank, an array of movable magnets on the other side, and a fluid cap forming a sealed chamber that applies a fluid pressure on the blank opposite the punch to form the part from two directions at the same time.

Referring to the embodiment illustrated in FIG. 16, the tooling 312 includes a sealed chamber 322 that applies a fluid pressure P on the blank to form the part. The sealed chamber 322 may be formed by a fluid cap 324 that retains and applies a fluid pressure, such as with gas or liquid, on the blank opposite the punch to form the part. In doing so, forming pressure could be applied to both sides of the material to be formed at the same time. In the illustration of FIG. 16, the fluid cap 324 is placed over one side of the tool 312 and the retained fluid would travel between the magnet's 316 to the surface of the material 310 being formed. The other pressure source is shown as a punch 318, which together with the fluid pressure would allow more complex forming criteria. With a fluid pressure applied to the top surface of the part to be formed, such downward pressure would enable the forming of additional features into the part. Again, the movable magnets 316 may be arranged to remain in contact with the blank during the forming process. In addition, the fluid or punch or both could be heated so to either maintain the temperature of the blank, such as the case if the blank has been preheated before forming, or to heat the blank in the tool as part of the forming process.

To further focus and direct the magnetic field to a desired location on the blank, it is contemplated that at least one of the magnetic sources or magnets or tooling may include a flux concentrator. As shown in FIG. 19, a flux concentrator 226 to concentrate the magnetic field to the location on the blank in contact with the magnet. It is contemplated that flux concentrators may be differently shaped and configured to provide such concentrated contact with the forming part.

Figure 20:
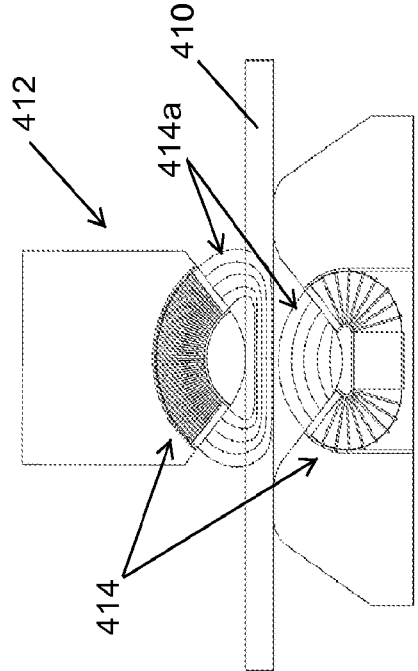
FIG. 20 is an end elevation of another tool of the present invention, with a forming die having integrated upper and lower electromagnetic coils that are imbedded into respective upper and lower pieces of the forming die.
Figure 21:
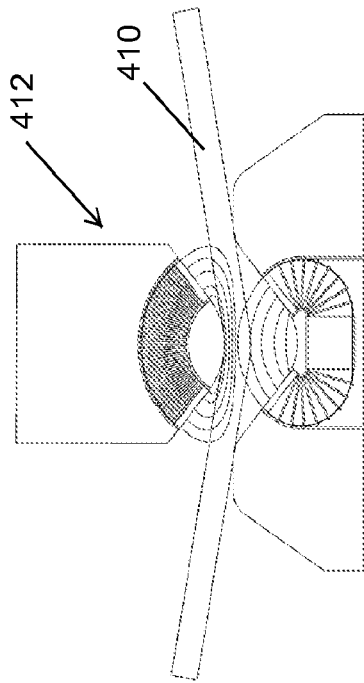
FIG. 21 is an end elevation of the tool of FIG. 20 at a stage of a corresponding forming process whereby the blank is bent as the magnetic field present and attracting the upper and lower pieces of the forming die toward each other.
Figure 22:
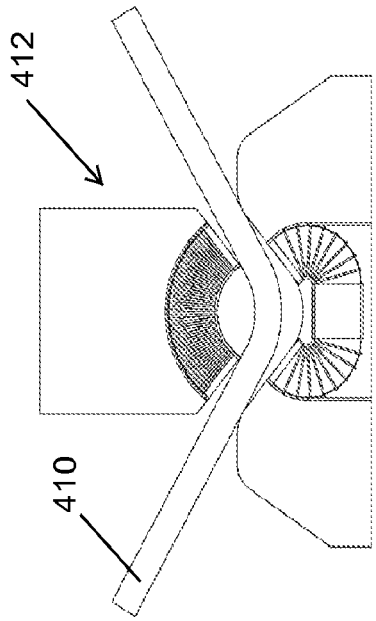
FIG. 22 is an end elevation of the tool of FIG. 20 at a stage of the corresponding forming process whereby the blank is bent by the forming die.

FIGS. 20-22 illustrate another embodiment of a tool with a forming die 412 having integrated upper and lower electromagnetic coils 414 that are imbedded into respective upper and lower pieces of the forming die 412. Magnetic fields 414a are applied to blank 410. The blank 410 is bent as the magnetic field 414a attract the upper and lower pieces of the forming die 412 toward each other.

Figure 24:
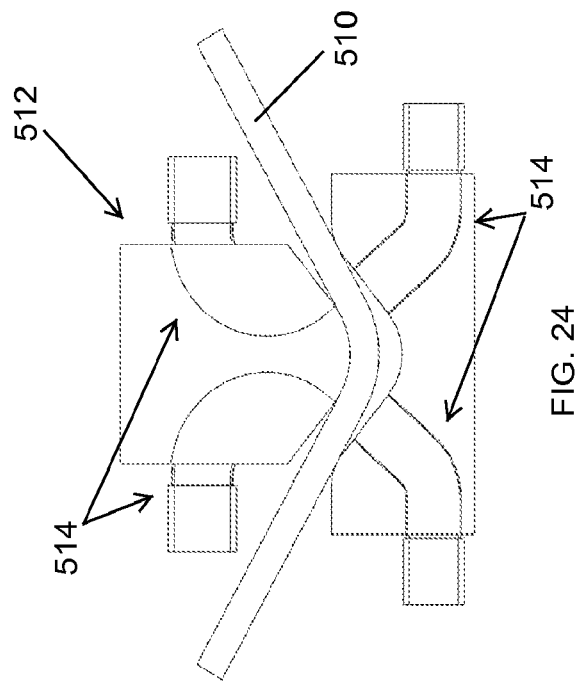
FIG. 24 is a cross-sectional view of the tool of FIG. 23, showing the upper and lower electromagnetic coils each having two separate portions that are aligned with each other to channel the flux to the part being formed and attract the upper and lower pieces of the forming die toward each other.
Figure 23:
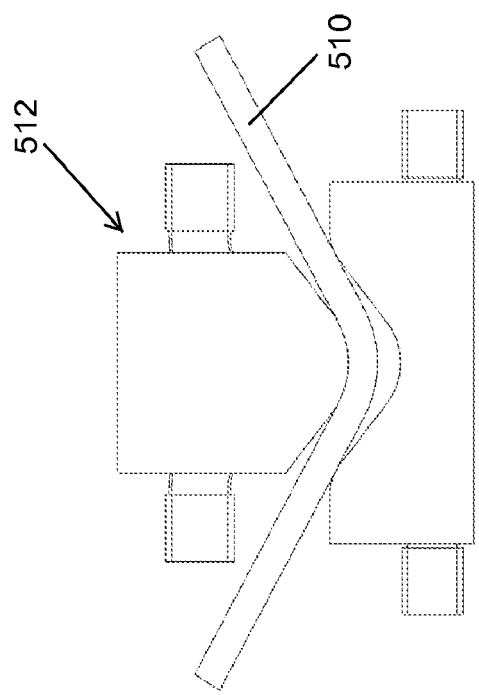
FIG. 23 is an end elevation of another tool of the present invention, with a forming die having integrated upper and lower electromagnetic coils that are partially imbedded into respective upper and lower pieces of the forming die and include part of the coil windings located outside of the die.
Figure 25:
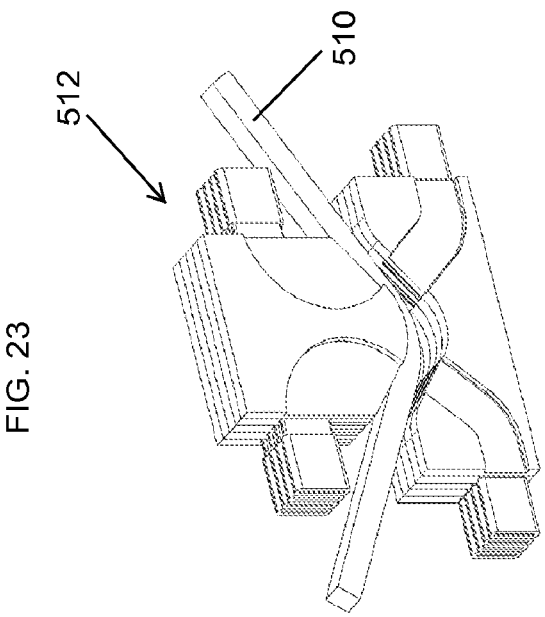
FIG. 25 is a perspective view of the tool of FIG. 23.

FIGS. 23-25 illustrate another embodiment of a tool with a forming die 512 having integrated upper and lower electromagnetic coils 514 that are partially imbedded into respective upper and lower pieces of the forming die. Part of the coil windings may be located outside of the die. In some examples, the upper and lower electromagnetic coils each have two separate portions that are aligned with each other to channel the flux to the part 510 being formed and attract the upper and lower pieces of the forming die toward each other.

Figure 26:
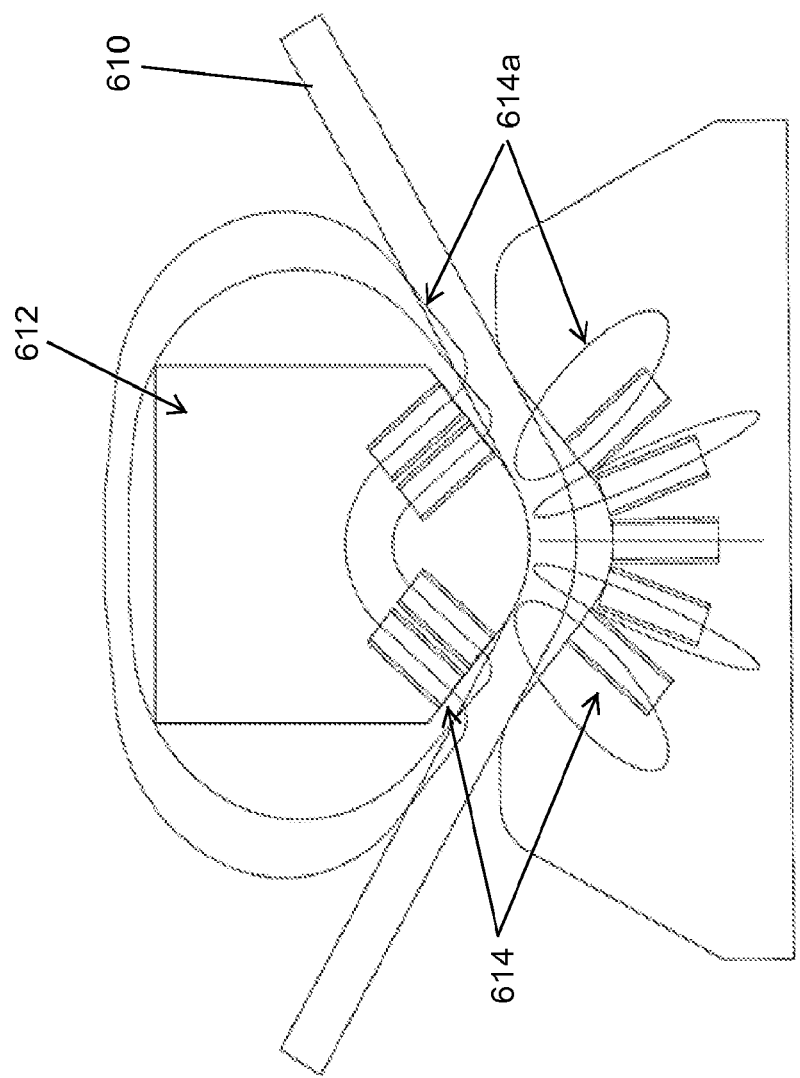
FIG. 26 is an end elevation of another tool of the present invention, with a forming die having integrated upper and lower electromagnetic coils that are embedded into respective upper and lower pieces of the forming die, where the coils are configured to create different magnetic fields with a field proximate the upper die to cause it to be magnetic and a separate field proximate the lower die, such that the magnetic fields here are distributed by the dies themselves, which allows the part to move during the forming process.

FIG. 26 illustrates another embodiment of a tool with a forming die 612 having integrated upper and lower electromagnetic coils 614 that are embedded into respective upper and lower pieces of the forming die. The coils are configured to create different magnetic fields 614a with a field proximate the upper die to cause it to be magnetic and a separate field proximate the lower die, such that the magnetic fields here are distributed by the dies themselves, which allows the part 610 to move during the forming process.

Figure 27:
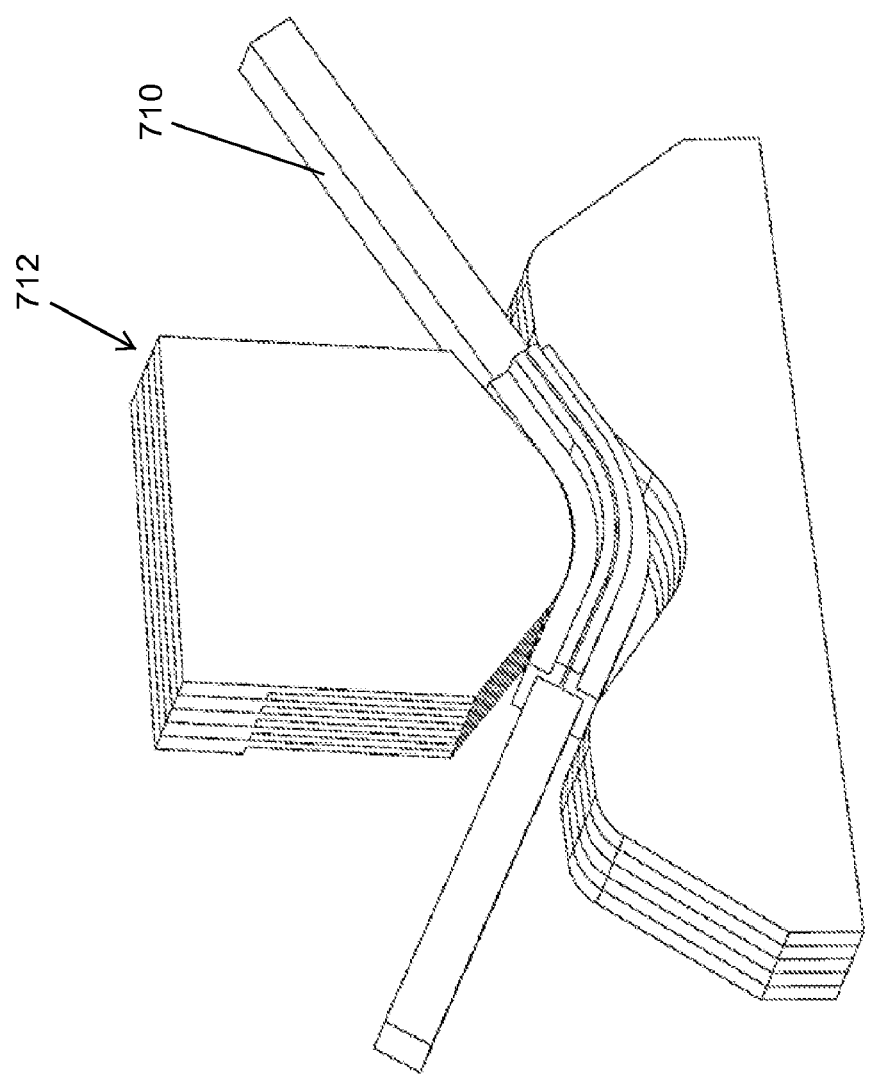
FIG. 27 is a perspective view of another tool of the present invention, with a forming die having integrated electromagnetic coils and a temporary copper wrap wrapped around the part to be formed to allow the coil to temporarily become part of the part being formed.
Figure 28:
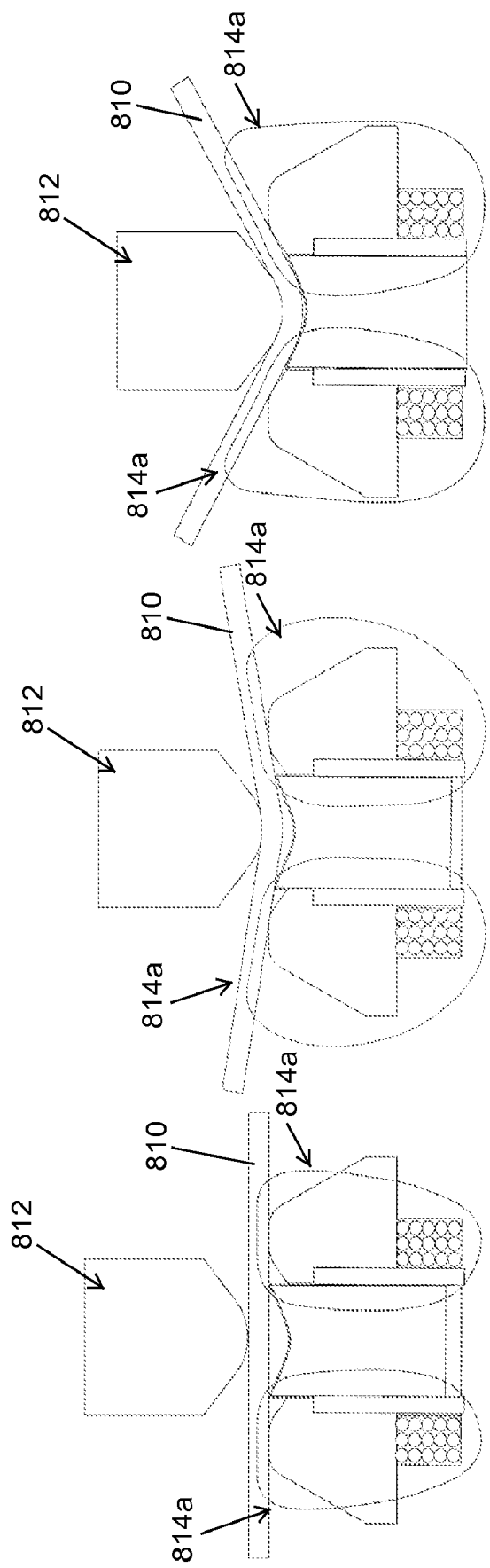
FIG. 28 shows end elevations of another tool during a forming process in accordance with the present invention, with a forming die having integrated electromagnetic coils and an electromagnetic core that moves up and down while in contact with the part being formed, such that the part itself becomes a magnetic field transferring part of the magnetic field.

FIG. 27 illustrates another embodiment of a tool with a forming die 712 having integrated electromagnetic coils and a temporary copper wrap wrapped around the part 710 to be formed to allow the coil to temporarily become part of the part being formed. FIG. 28 illustrates another embodiment of a tool during a forming process with a forming die 812 having integrated electromagnetic coils and an electromagnetic core that moves up and down while in contact with the part 810 being formed, such that the part itself becomes a magnetic field transferring part of the magnetic field 814a.

Optionally, to control temperature of the material, heat may be applied to at least one of the tooling and the blank. The blank being used in the Mag Forming process can be preheated outside of the Mag Forming tooling and transferred in or the blank can be heated from inside the tooling. The source of the heat can be from induction, conduction, convection, radiation, or phase change. Induction heating can come from the same coils used to generate the magnetic field or a separate set of coils. Heat can be conducted to the blank by heating the Mag Forming tooling which then transfers heat to the blank or the blank and/or tooling are heated by convection with hot or superheated gases or liquids. Similarly, superheated gases condense on the tooling or blank which transfers energy from to the components through a combination of convection, conduction, and phase change. Additionally, lasers or inferred light or other form of high energy spectrum light can radiate energy onto the tooling or blank. Or, more simply, the tooling and/or blank can be heated in an oven.

Optionally, the process of the present invention could also be integrated with internal quenching, to assist increasing production, or enhancing material characteristics by controlling the quenching rate of the material. Quenching could be induced through liquid, such as water or oil or the like, gas, such as air, nitrogen, or argon or the like, or combinations of liquid and gas. In addition, quenching could be induced by rapidly chilling one or both of the shape inducing tooling components.

Optionally, to control magnetic frequency, the Mag Forming tooling that has one or more magnetic sources, such as integrated electromagnetic coils, an external electromagnetic coil, or other integrated, internal, or external magnetic sources. Examples of other magnetic sources include, but are not limited to, superconducting magnets, permanent magnets, super-magnets, temporary magnets, electromagnets, and any other magnetic source in any sort of array, such as a Halbach array. In addition, the invention may also include magnetic fields that could be generated from multiple different types of magnetic sources either in sequence, in phased sequences, in phased sequences such as using switching to turn the magnetic fields on and off, either together or separately, sequentially or simultaneously. In addition, the invention may also include all of the aforementioned different methods of applying single or multiple fields, but in addition applying pressure to the workpiece from one or more sources, such as from solid punch, a fluid (gas or liquid), or both at the same time. Temporary magnets behave like permanent magnets while under the influence of a magnetic field. With regards to Mag Forming, a temporary magnet could be a piece of iron influenced by a superconducting magnet, which would then cause the piece of iron to create a magnetic field for the Mag Forming purposes.

With further reference to controlling magnetic frequency, electromagnetic coils of the magnetic source can generate a magnetic field that can be a steady state, direct current, type of field or a non-steady state field. The non-steady state field can be generated by running an alternating current through the electromagnetic coils or have varying ramp-ups and downs that create non-periodic fluctuations in the magnetic field. Furthermore, the magnetic field can vary in intensity resulting in a gradient field. For example, magnetic fields from a few milligauss to over 10 Tesla in strength can be used in Mag Forming. It is also possible that the changing magnetic field can be produced by physically moving the part relative to the magnetic field, or vice versa. An example of this situation is when the tooling or part has an oscillation into and out of the magnetic field or from one polarity to the other. This can be achieved by moving the magnetic source while holding the tooling stationary, moving the tooling while holding the magnetic field stationary, or moving both the magnetic field and tooling relative to one another.

Alternatively, the magnetic field may be turned on and off at a given frequency. This method could be used at any forming speed, but may be practically important at slow forming speeds. If the particular material exhibits slightly enhanced elongation during the ramp up of the magnetic field, then the strain rate is defined by the ramp up cycle or vice versa. With this scenario, the magnetic field can be easily cycled on and off thereby allowing more periods of enhanced elongation. The frequency of the magnetic field cycling could be as little as about 1 Hz or as high as about 500,000 kHz. The selected frequency depends on the material, geometry, and required formability.

Alternatively, the charge of the magnetic field may be changed, such as from positive to negative and back to positive again, and so forth during the forming process.

The Mag Forming process may also use one or more tools or interchangeable tools with a single magnetic source. For example, an electromagnet can be large enough to generate a magnetic field that is capable of supporting multiple Mag Forming tools. Furthermore, these tools can be swapped out as needed without having to change the magnetic source.

Therefore, the present invention provides a process that enhances forming properties of high strength materials, such as metals and the like, to allow complex die forming by utilizing magnetic plasticity to repair microscopic fissures and stress fractures before they develop into cracks and stress risers. This process provides a magnetic field, such as between 0.001 T and 20.0 T, that at least partially saturates a blank in a tooling that forms that blank into a part, such that the field interacts with the electrons of the blank's material on an atomic level and causes them to shift. This shifting of atoms allows for enhanced forming properties in otherwise unbendable metals or metals that are typically difficult to form, and increases the stamping process speeds for other metals that can be stamped or formed. And further, the process of the present invention enhances the forming capabilities of a material at low temperatures, such that RHA and Hi-Hard armor can be formed to achieve a tighter bend radius without losing existing properties or requiring additional thermal processing.

The tooling that is unitized in the Mag Forming process includes an upper die piece and a lower die piece with the magnetic source generating the magnetic field incorporated in or otherwise coupled with one or both of the die pieces. For example, the upper die piece may include a peripheral structure that surrounds an array of movable magnetic elements and the lower die piece may provide a forming pressure against the blank on an opposite side of the magnetic element. Such a forming pressure may be applied by a movable punch, hydraulic fluid, air, or other forming means. As the blank deforms, these movable magnetic elements may move to conform to the deformed shape of the blank and remain in close proximity or direct contact with the blank to provide the magnetic field and associated magnetic plasticity that allows the blank to deform in such a manner under the forming pressure applied by the lower die piece. Further, a second forming pressure may be applied to the upper side of the blank, opposite the lower die piece, to provide resistance and allow the blank to be formed with additional features from those formed by the single forming pressure. The magnetic field may be increased in strength and/or frequency as the forming pressures are increased to bend the blank being formed. The effect of the magnetic field results in enhanced ductility and increased elongation of the blank being formed by the tooling.

Changes and modifications to the specifically described embodiments may be carried out without departing from the principles of the present invention, which is intended to be limited only by the scope of the appended claims as interpreted according to the principles of patent law including the doctrine of equivalents.

The invention claimed is:
1. A process for forming a part, said process comprising:
providing a tooling configured to form a blank into the part;
generating a direct current non-steady state magnetic field with at least one magnetic source that at least partially saturates the blank in the tooling;
forming the part with the tooling by plastically deforming the blank in the presence of the direct current non-steady state magnetic field to increase the blank's formability; and
wherein the direct current non-steady state magnetic field has a strength equal to or greater than 0.5 teslas.

2. The process of claim 1, wherein a material of the blank comprises at least one selected from the group consisting of a high strength steel, a ballistic armor, aluminum, magnesium, stainless steel, ceramic, plastic, and fiber-reinforced composite.

3. The process of claim 1, wherein the magnetic source comprises at least one selected from the group consisting of an electromagnet, a superconducting magnet, a permanent magnet, and a temporary magnet.

4. The process of claim 1, wherein the magnetic source comprises a plurality of independently movable magnetic elements.

5. The process of claim 4, wherein the plurality of independently movable magnetic elements move to each other to conform to a shape of the blank as it is plastically deformed.

6. The process of claim 5, comprising a movable punch, wherein the movable punch contacts the blank on a first side to deform the blank, and wherein each independently movable magnetic element contacts the blank on a second side while conforming to the shape of the blank as the movable punch plastically deforms the blank, and wherein the first side is different than the second side.

7. The process of claim 1, wherein the tooling includes a sealed chamber that applies a fluid pressure on the blank to form the part.

8. The process of claim 1, wherein at least one of the magnetic source and the tooling comprise a flux concentrator to direct the magnetic field to a desired location on the blank.

9. The process of claim 1, further comprising:
applying heat to at least one of the tooling and the blank, wherein the heat is transferred via at least one selected from the group consisting of induction, conduction, convection, radiation, and phase change.

10. The process of claim 1, wherein the blank comprises one selected from the group consisting of (i) rolled homogenous armor and (ii) work-hardened steel.

11. The process of claim 1, wherein the direct current non-steady state magnetic field comprises a pulsed magnetic field.

12. A process for forming a part, said process comprising:
providing a tooling configured to form a blank into the part;
generating a direct current non-steady state magnetic field with at least one magnetic source that at least partially saturates the blank in the tooling;
forming the part with the tooling by plastically deforming the blank in the presence of the direct current non-steady state magnetic field to increase the blank's formability; and
wherein forming the part with the tooling by plastically deforming the blank in the presence of the magnetic field to increase the blank's formability comprises forming the part at a temperature low enough to maintain 95 percent of a hardness of the blank.

13. The process of claim 12, wherein a material of the blank comprises at least one selected from the group consisting of a high strength steel, a ballistic armor, aluminum, magnesium, stainless steel, ceramic, plastic, and fiber-reinforced composite.

14. The process of claim 12, wherein the magnetic source comprises at least one selected from the group consisting of an electromagnet, a superconducting magnet, a permanent magnet, and a temporary magnet.

15. The process of claim 12, wherein the magnetic source comprises a plurality of independently movable magnetic elements, and wherein the plurality of independently movable magnetic elements move to each other to conform to a shape of the blank as it is plastically deformed.

16. The process of claim 12, wherein the tooling includes a sealed chamber that applies a fluid pressure on the blank to form the part.

17. The process of claim 12, wherein at least one of the magnetic source and the tooling comprise a flux concentrator to direct the magnetic field to a desired location on the blank.

18. The process of claim 12, further comprising:
applying heat to at least one of the tooling and the blank, wherein the heat is transferred via at least one selected from the group consisting of induction, conduction, convection, radiation, and phase change.

19. The process of claim 12, wherein the blank comprises one selected from the group consisting of (i) rolled homogenous armor and (ii) work-hardened steel.

20. The process of claim 12, wherein the direct current non-steady state magnetic field comprises a pulsed magnetic field.

* * * * *